(12) United States Patent
Zhang et al.

(10) Patent No.: US 12,271,689 B2
(45) Date of Patent: Apr. 8, 2025

(54) TEXT DUPLICATE CHECKING METHOD, ELECTRONIC DEVICE AND COMPUTER-READABLE STORAGE MEDIUM

(71) Applicant: Aishu Technology Corp., Shanghai (CN)

(72) Inventors: Xiaoyuan Zhang, Shanghai (CN); Xiao Chen, Shanghai (CN)

(73) Assignee: AISHU TECHNOLOGY CORP., Shanghai (CN)

(*) Notice: Subject to any disclaimer, the term of this patent is extended or adjusted under 35 U.S.C. 154(b) by 267 days.

(21) Appl. No.: 17/905,220

(22) PCT Filed: Aug. 12, 2020

(86) PCT No.: PCT/CN2020/108653
§ 371 (c)(1),
(2) Date: Aug. 29, 2022

(87) PCT Pub. No.: WO2021/169186
PCT Pub. Date: Sep. 2, 2021

(65) Prior Publication Data
US 2023/0122661 A1    Apr. 20, 2023

(30) Foreign Application Priority Data
Feb. 29, 2020    (CN) .......................... 202010132181.9

(51) Int. Cl.
*G06F 40/194*    (2020.01)
*G06F 16/174*    (2019.01)
(Continued)

(52) U.S. Cl.
CPC ........ *G06F 40/194* (2020.01); *G06F 16/1748* (2019.01); *G06F 16/383* (2019.01);
(Continued)

(58) Field of Classification Search
CPC .. G06F 40/194; G06F 16/1748; G06F 16/383; G06F 18/22; G06F 40/216; G06F 40/289
(Continued)

(56) References Cited

U.S. PATENT DOCUMENTS

| 2019/0332722 A1* | 10/2019 | Ogren ............... G06F 16/90344 |
| 2023/0122661 A1* | 4/2023 | Zhang ................... G06F 40/289 704/9 |
| 2023/0136368 A1* | 5/2023 | Zhang ................... G06F 40/216 704/9 |

FOREIGN PATENT DOCUMENTS

| CN | 103970722 A | * | 8/2014 | |
| CN | 109145080 A | * | 1/2019 | ........... G06F 40/289 |

(Continued)

OTHER PUBLICATIONS

Search Report issued in International Patent Application No. PCT/CN2020/108653 on Nov. 27, 2020.

(Continued)

*Primary Examiner* — Edwin S Leland, III
(74) *Attorney, Agent, or Firm* — Mark H. Whittenberger; Holland & Knight LLP

(57) ABSTRACT

Provided are a text duplicate checking method, an electronic device and a computer-readable storage medium. The method includes storing a fingerprint set and a corresponding text ID in a byte data manner to obtain a fingerprint library; acquiring a target text and creating a target fingerprint; obtaining a comparison fingerprint set from map memories according to the target fingerprint, and calculating a similarity between the target fingerprint and each comparison fingerprint in the comparison fingerprint set separately; and based on a determination result that a number of 1s in binary values of one similarity is less than or equal to (Continued)

a preset value, querying a text ID corresponding to the one similarity, to implement duplicate checking of the target text.

15 Claims, 6 Drawing Sheets

(51) Int. Cl.
  *G06F 16/383* (2019.01)
  *G06F 18/22* (2023.01)
  *G06F 40/216* (2020.01)
  *G06F 40/289* (2020.01)
(52) U.S. Cl.
  CPC ............ *G06F 18/22* (2023.01); *G06F 40/216* (2020.01); *G06F 40/289* (2020.01)
(58) Field of Classification Search
  USPC ............................................................ 704/9
  See application file for complete search history.

(56) References Cited

FOREIGN PATENT DOCUMENTS

| CN | 109359183 A | * | 2/2019 | ........... G06F 40/279 |
|---|---|---|---|---|
| CN | 109471921 A | * | 3/2019 | ........... G06F 40/194 |
| CN | 109947991 A | * | 6/2019 | ............... G06K 9/68 |
| CN | 110516212 A | * | 11/2019 | ............ G06F 16/116 |
| CN | 111324750 A | * | 6/2020 | ........... G06F 16/383 |
| WO | WO-2014028860 A2 | * | 2/2014 | ......... G06F 16/2468 |
| WO | WO-2019085941 A1 | * | 5/2019 | ................ G06K 9/68 |
| WO | WO-2021169186 A1 | * | 9/2021 | ........... G06F 16/383 |

OTHER PUBLICATIONS

First Office Action issued in Chinese Patent Application No. 202010132181.9 mailed Feb. 8, 2021 (Machine translation).

* cited by examiner

TEXT DUPLICATE CHECKING METHOD, ELECTRONIC DEVICE AND COMPUTER-READABLE STORAGE MEDIUM

RELATED APPLICATIONS

The subject application is a U.S. National Stage application of International Application No. PCT/CN2020/108653, filed on 12 Aug. 2020, which claims the benefit of Chinese Patent Application No. 202010132181.9, filed on 29 Feb. 2020. The contents of each application incorporated herein by reference.

TECHNICAL FIELD

The present disclosure relates to the technical field of text analysis, for example, a text duplicate checking method, an electronic device and a computer-readable storage medium.

BACKGROUND

In the field of text analysis, the calculation of text similarity is a popular research direction and can be applied in the field of text duplicate checking. However, most of methods in the related art only focus on the similarity calculation for a short text, including the calculation of edit distance, the calculation of the Jaccard index, the term frequency (TF) and word2vec. The edit distance refers to a minimum number of edition operations required for converting one string into another string between two strings. The greater the edit distance is, the more different the texts are. The edit operations include insertion, substitution and deletion. The Jaccard index refers to a value obtaining by dividing the size of the intersection of two texts by the size of the union of the two texts, where the larger the value is, the more similar the texts are. The TF or term frequency-inverse document frequency (TF-IDF) value refers to a cosine value of two vectorized texts, where the larger the value is, the more similar the two texts are. The word2vec refers to a trained model through which a cosine value is calculated after each word is converted into a vector, where the larger the value is, the more similar the texts are. The preceding methods have relatively high efficiency in determining the similarity between a small number of short texts, but have low efficiency in calculating the similarity between a large number of long texts or in text duplicate checking.

When similarity calculation is performed on a large scale of texts, in the related art, the texts are generally stored by using a fingerprint method, and finally the similarity calculation is implemented by using a fingerprint comparison method. In the related art, document fingerprints are stored as string (that is, similar to "1010100011") data, fingerprint strings are stored in a database, and then the number of different bits of two strings is calculated by using the Hamming distance and used as the distance between two fingerprints, thereby obtaining the similarity between documents. This method has the following two defects: a large amount of space needs to be occupied when data is stored; and when more texts are compared, more time are generally spent on querying the document fingerprints.

SUMMARY

The present application provides a text duplicate checking method, an electronic device and a computer-readable storage medium. A fingerprint in the form of integers is stored by using byte data so that the data storage space can be greatly reduced; and an integer exclusive OR (XOR) operation is used so that a distance between fingerprints is calculated quickly, and while the accuracy is ensured, the efficiency of similarity calculation and text duplicate checking can be greatly improved.

The present application may be implemented by the technical schemes described below.

A text duplicate checking method includes the steps described below.

In S1, an original text data set is acquired and a corresponding fingerprint set in an integer form is created, where the original text data set includes multiple statements, and each of the multiple statements is provided with a corresponding text identity (ID).

In S2, both the fingerprint set and a text ID corresponding to each of fingerprints in the fingerprint set are stored in a byte data manner to obtain a fingerprint library.

In S3, a target text is acquired and a corresponding target fingerprint is created.

In S4, all byte data are read from the fingerprint library and all the fingerprints and corresponding text IDs are stored in corresponding map memories.

In S5, a comparison fingerprint set is obtained from the map memories according to the target fingerprint, a similarity between the target fingerprint and each of comparison fingerprints in the comparison fingerprint set is calculated separately by using an integer XOR operation method, and a number of 1s in binary values of each similarity is recorded.

In S6, based on a determination result that the number of 1s in the binary values of one similarity is less than or equal to a preset value, a text ID corresponding to a comparison fingerprint corresponding to the one similarity in the map memories is queried, to implement duplicate checking of the target text.

An electronic device includes a processor and a memory configured to store a program.

The program, when executed by the processor, causes the processor to perform any preceding text duplicate checking method.

A computer-readable storage medium storing computer-executable instructions, where the computer-executable instructions are configured to execute any preceding text duplicate checking method.

DETAILED DESCRIPTION

The present application is described hereinafter in detail in conjunction with drawings and embodiments.

Embodiment

Figure 1:
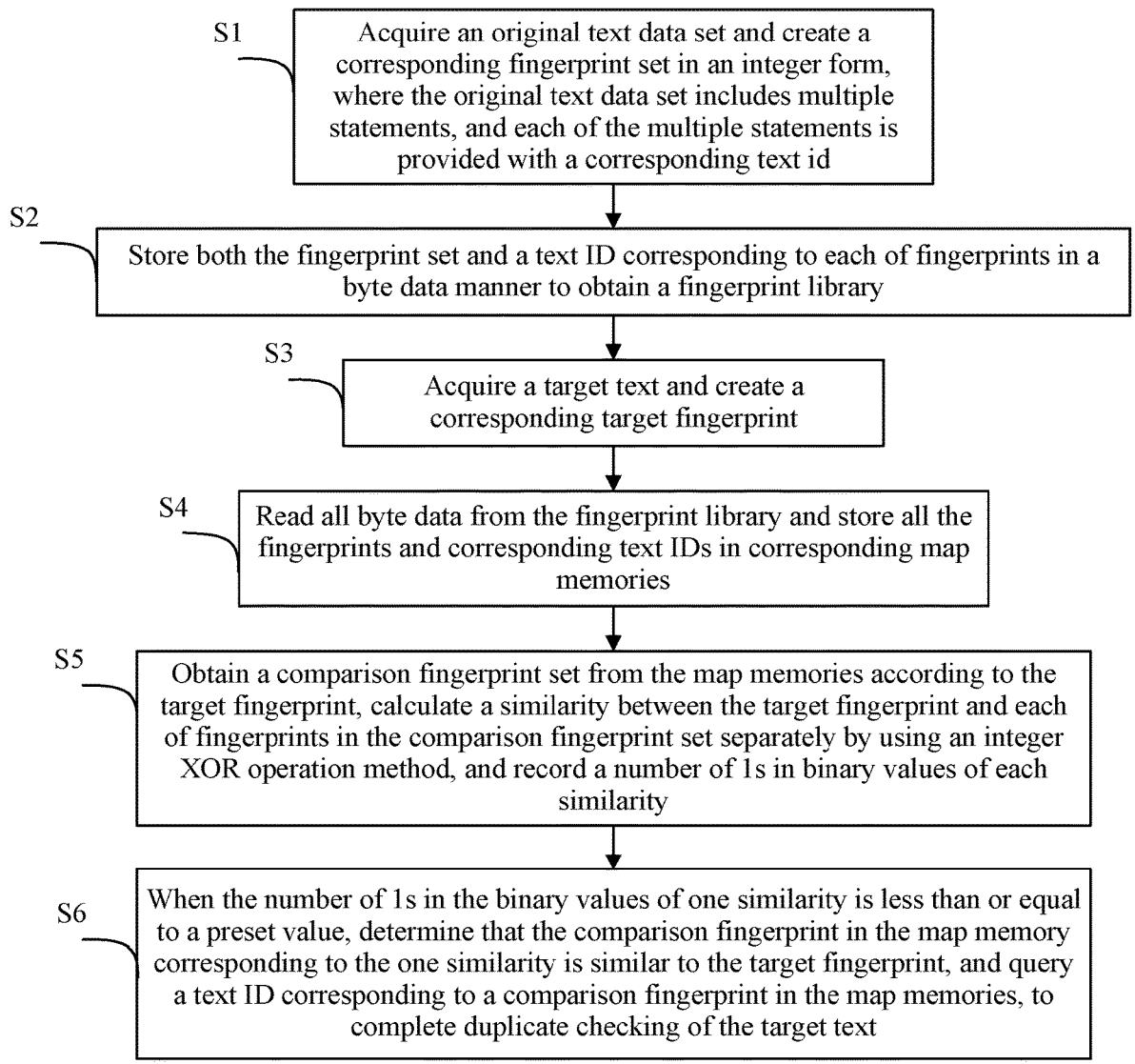
FIG. 1 is a flowchart of a method according to the present application.

As shown in FIG. 1, the present application provides a method for calculating a large-scale text similarity and for text duplicate checking. The method includes the steps described below.

In S1, an original text data set is acquired and a corresponding fingerprint set in an integer form is created, where the original text data set includes multiple statements, and each statement is provided with a corresponding text ID.

In S2, the fingerprint set and a text ID corresponding to each fingerprint are stored in a byte data manner to obtain a fingerprint library.

In S3, a target text is acquired and a corresponding target fingerprint is created.

In S4, all byte data are read from the fingerprint library and all fingerprints and corresponding text IDs are stored in corresponding map memories.

In S5, a comparison fingerprint set is obtained from the map memories according to the target fingerprint, a similarity between the target fingerprint and each fingerprint in the comparison fingerprint set is calculated separately by using an integer XOR operation method, and a number of 1s in binary values of each similarity is recorded.

In S6, when the number of 1s in the binary values of the similarity is less than or equal to a preset value, it is determined that the comparison fingerprint in the map memory corresponding to this similarity is similar to the target fingerprint, and the text ID corresponding to the comparison fingerprint in the map memories is queried, so as to complete duplicate checking of the target text.

In the present application, a text that is the same as or similar to the target text can be quickly determined and found in a mass text library. The present application may be applied to blindly searching for same or similar texts in the mass text library, and operations such as deduplication or searching for files with a relatively high degree of similarity to perform recommendation may be performed. The present application may be applied to searching for a confidential document, quickly and effectively determining the confidential document and preventing disclosure.

A process of this embodiment using the preceding method may be shown in FIG. 2 and includes three steps described below.

In the first step, fingerprints (①) are created.
In the second step, the fingerprints are stored to form a fingerprint library (②).
In the third step, similar or same documents (③) are searched for from the fingerprint library through similarity calculation.

Figure 3:
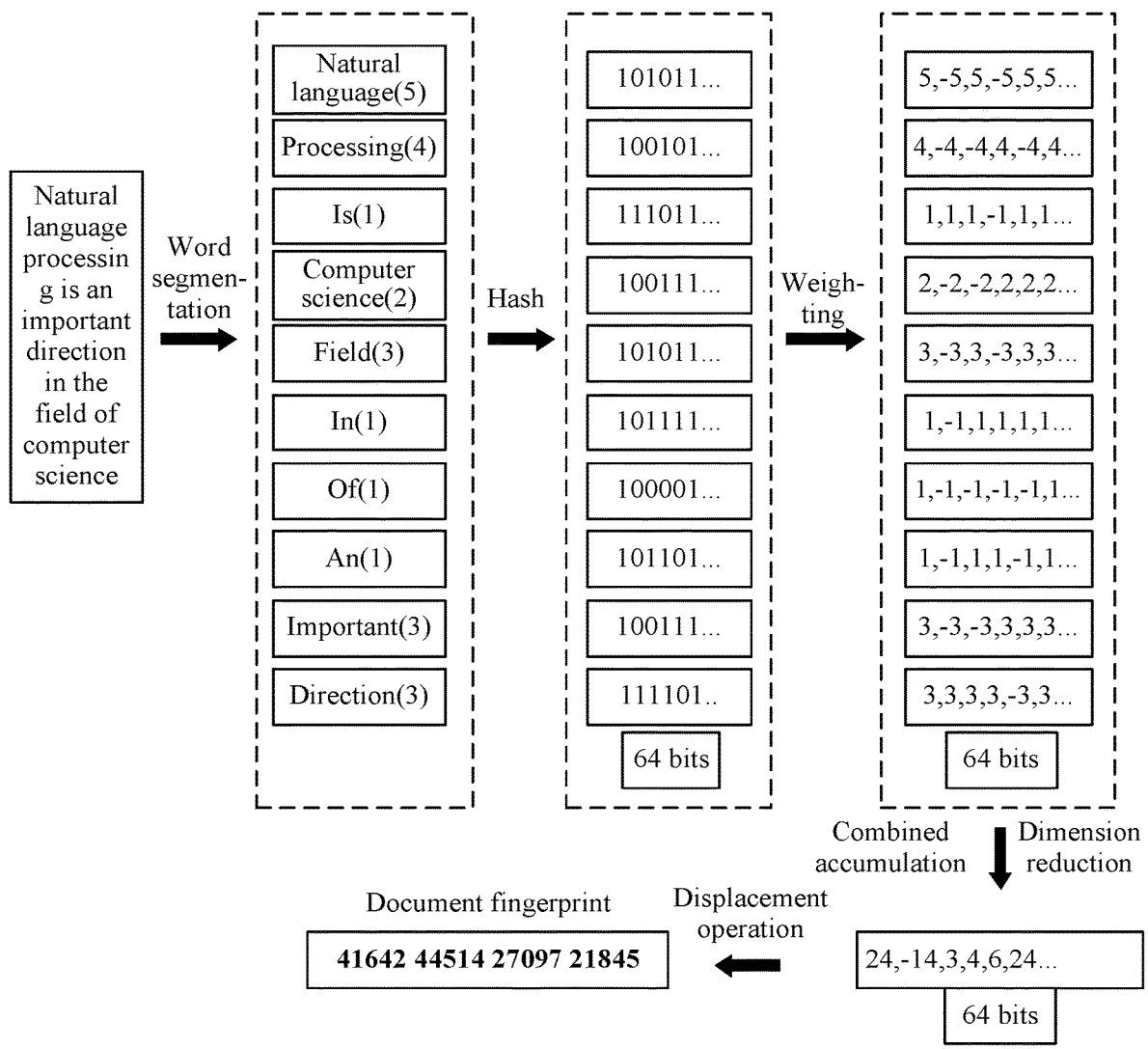
FIG. 3 is a schematic diagram of a process of creating a fingerprint according to an embodiment of the present application.

When the fingerprints are created in the first step, as shown in FIG. 3, the first step may be divided into five steps, that is, word segmentation, hash, weighting, combination, and dimension reduction.

(1) Word Segmentation

A statement is given, and word segmentation is performed to obtain valid feature vectors. For example, five levels of weights, such as 1 to 5, may be set for each feature vector (if a text is given, the feature vector may be a word in the text, and the weight of the word may be the number of occurrences of the word or a word segmentation weight coefficient or may be the importance degree of the word). For example, the following statement is given: "natural language processing is an important direction in the field of computer science". After word segmentation, the statement is "natural language processing is an important direction in the field of computer science", and then each feature word may be provided with the weight as follows: natural language (5) processing (4) is (1) an (1) important (3) direction (3) in (1) the field (3) of (1) computer science (2), where the number in each parenthesis denotes the importance degree of the word in the whole statement, and the larger the number is, the more important the word is.

(2) Hash

A hash value of each feature vector is calculated through a hash function, where the hash value is an n-bit signature composed of binary numbers 0 and 1. For example, the hash value of "natural language" is "101011 . . . ". In this manner, a text language string becomes a series of numbers.

(3) Weighting

Based on hash values, all the feature vectors are weighted, that is, W=Hash*weight. Moreover, the hash value is multiplied positively by the weight when 1 is encountered, and the hash value is multiplied negatively by the weight when 0 is encountered. For example, the hash value "101011 . . . " of "natural language" is weighted as follows: W ("natural language", a weight bit is 5)=5 −5 5 −5 5 5 . . . ; the hash value "100101 . . . " of "processing" is weighted as follows: W (processing, a weight is 4)=4 −4 −4 4 −4 4 . . . ; and similar operations may be performed on the remaining feature vectors.

(4) Combined Calculation and Dimension Reduction

Weighted results of the preceding feature vectors are accumulated to become only one sequence string.

The first two feature vectors are used as examples. For example, "4 −4 −4 4 −4 4 . . . " of "processing" and "5 −5 5 −5 5 5 . . . " of "natural language" are accumulated, that is, "4+5 −4+−5 −4+5 4+−5 −4+5 4+5", and "9 −9 1 −1 1 9 . . . " may be obtained.

(5) Displacement Operation with the Following Differences Compared with the Method in the Related Art:

The accumulation result of the n-bit signature has 64 bits in total, and a displacement operation is performed once every 16 bits. If 16-bit data is greater than or equal to 0, the 16-bit data is displaced to the right by one bit and 1 is added; and if 16-bit data is less than 0, the 16-bit data is displaced to the right by one bit, but 1 is not added. In this manner, fingerprint integer values of the document may be obtained and used as a data fingerprint of the document. For example, the displacement operation is performed on "9 −9 1 −1 1 9 . . . " calculated above to obtain four integers [41642, 44514, 27097, 21845] as the data fingerprint of the document.

Figure 4:
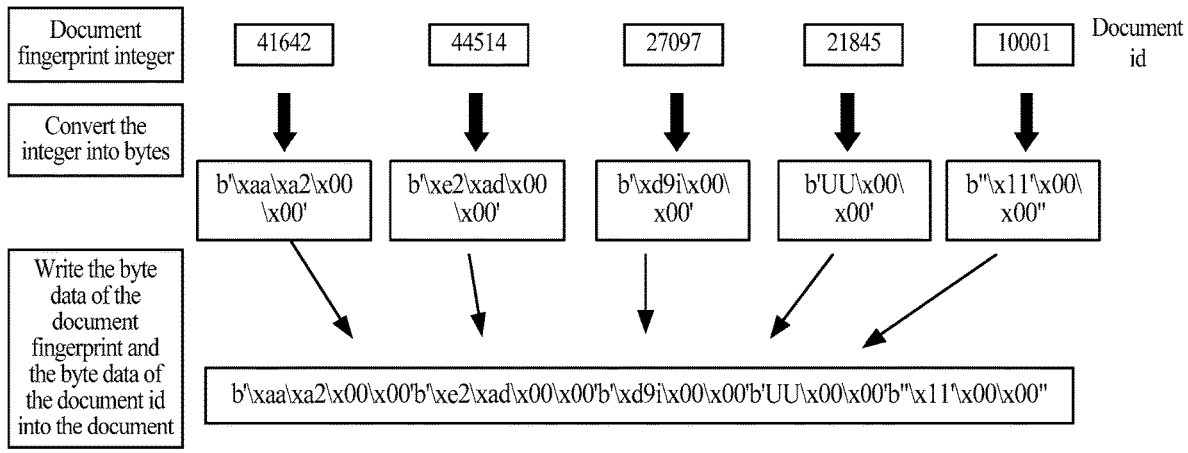
FIG. 4 is a schematic diagram of a process of storing a fingerprint according to an embodiment of the present application.

In the second step of storing the fingerprints, as shown in FIG. 4, in a massive fingerprint comparison, if binary data in the form of an original string is stored, it is visual and better understood, but the storage occupies a relatively large space and the reading efficiency is lower.

According to a storage scheme, after the data fingerprint of the document are obtained, integers may be converted into byte data, and the document ID may also be converted into byte data and stored in the document together with the binary data of the document fingerprint (two advantages of converting into the byte data are the less occupied space and the faster reading). Massive texts form massive document fingerprints and ID byte data, thereby forming a document fingerprint library, where the fingerprint library may be used for searching for similar or same documents.

Figure 5:
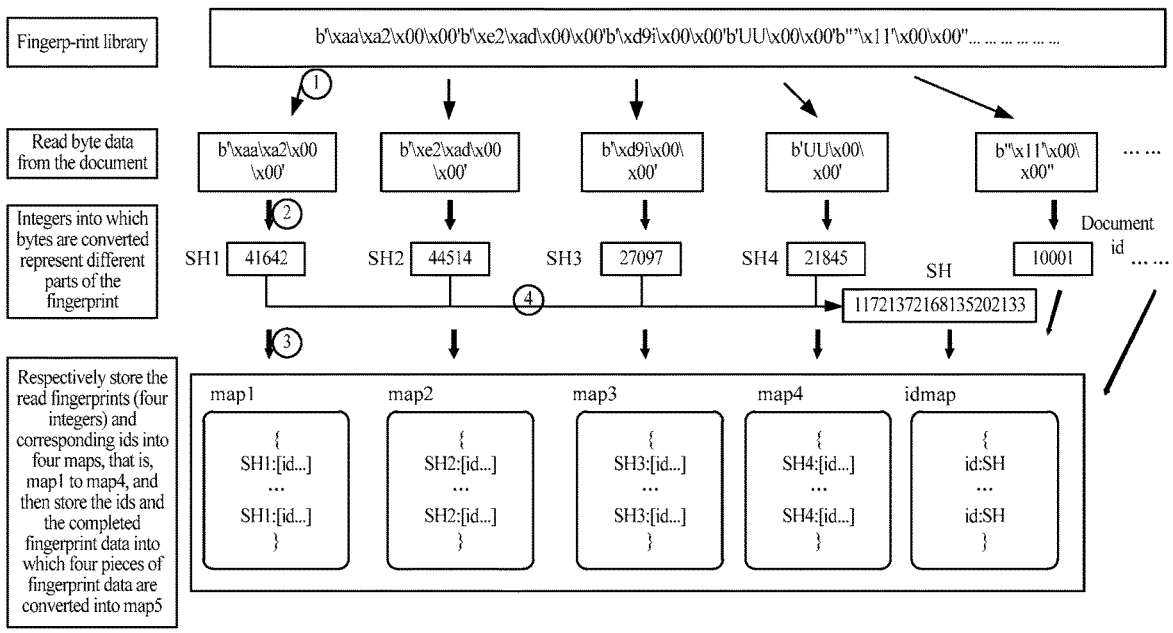
FIG. 5 is a schematic diagram of a process of reading a fingerprint into map memories according to an embodiment of the present application.
Figure 6:
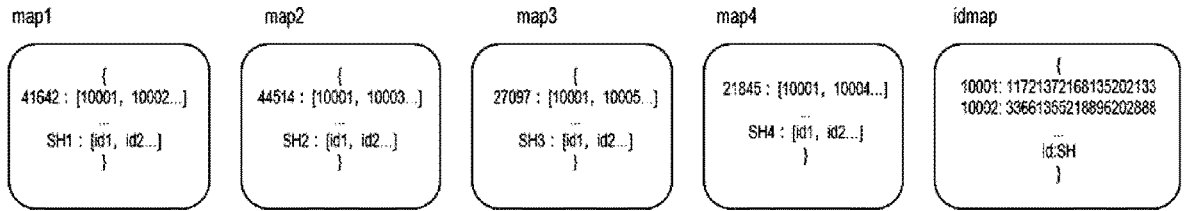
FIG. 6 is a schematic diagram of map memory formats according to an embodiment of the present application.
Figure 7:
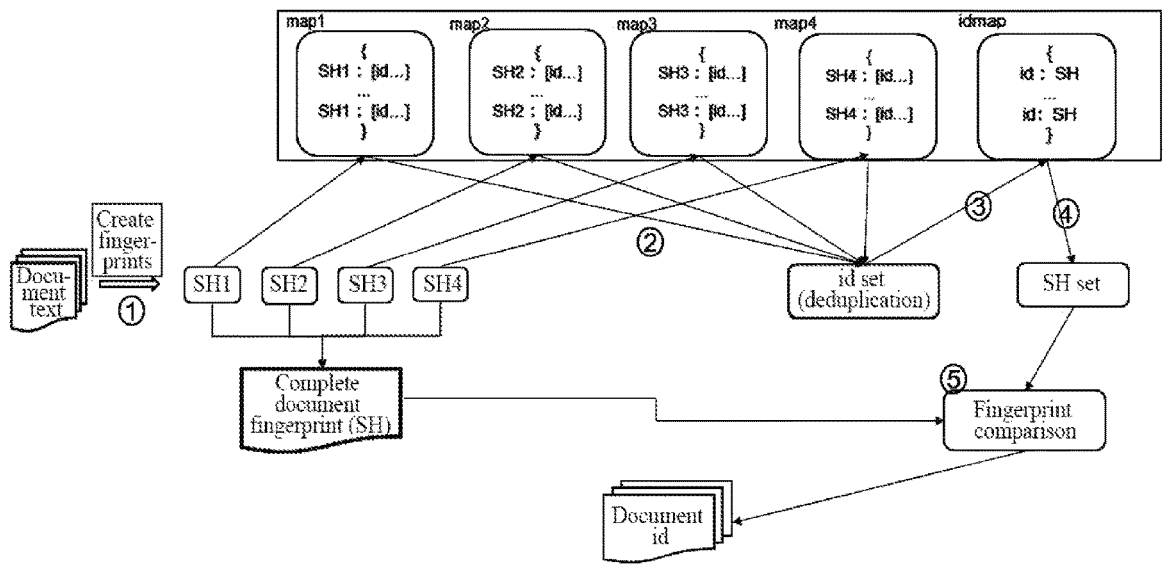
FIG. 7 is a schematic diagram of a process of text duplicate checking according to an embodiment of the present application.

The third step of similarity calculation to search for similar or same documents as shown in FIGS. 5 to 7 is described below.

(1) As Shown in FIG. 5, all Fingerprints are First Read from the Fingerprint Library into the Memories.

Since the fingerprint library stored in the document is stored as byte data of fingerprint segmentation and IDs, every 20 bytes represent one document fingerprint and a corresponding ID. Every four bytes in the 20 bytes represent a number, totaling five numbers, respectively representing first 16-bit data, second 16-bit data, third 16-bit data, fourth 16-bit data and file ID data of the fingerprint segmentation. That is, first 4-byte data to fourth 4-byte data of the byte data correspond to four fingerprint integer values, respectively, and fifth 4-byte data corresponds to a corresponding text ID integer value. The byte data is read from the fingerprint library (step ①), converted into integers (step ②), and then stored in corresponding first four map formats sequentially (step ③) while the integers are stored in the maps, four pieces of fingerprint data generate one piece of complete fingerprint data (step ④), and the complete fingerprint data is stored in the fifth index map for indexing data. In this manner, all data in a document library is stored in the memories, and the map memory data format may be shown in FIG. 6.

(2) As Shown in FIG. 7, Text Duplicate Checking is Performed.

After all the data in the fingerprint library is read into corresponding map memories, the text duplicate checking may be performed to obtain same or similar article IDs of a target file. For example, there is a confidential document, and it is required to find out whether a document same as or similar to the confidential document exists in the document library. The steps described below may be adopted.

In the first step (for example, step ①), fingerprints are first created for the confidential document. The process may be shown in FIG. 2. A created fingerprint is also represented by four integers, and the fingerprint data is 41642, 44514, 27097 and 21845.

In the second step (for example, step ②), an ID set of each corresponding document is obtained from map1 to map4 through four integer values in the fingerprint data, and the ID set obtained through the fingerprint data is [10001, 10002, 10003, 10004, 10001].

In the third step (for example, step ③) the ID set is deduplicated and only the IDs [10001, 10002, 10003, 10004] are retained. After the IDs are obtained, the fingerprint data of each ID is obtained from the idmap, where the fingerprint data is [11721372168135202133, 33661355218896202888 . . . ].

Figures 8, 9:
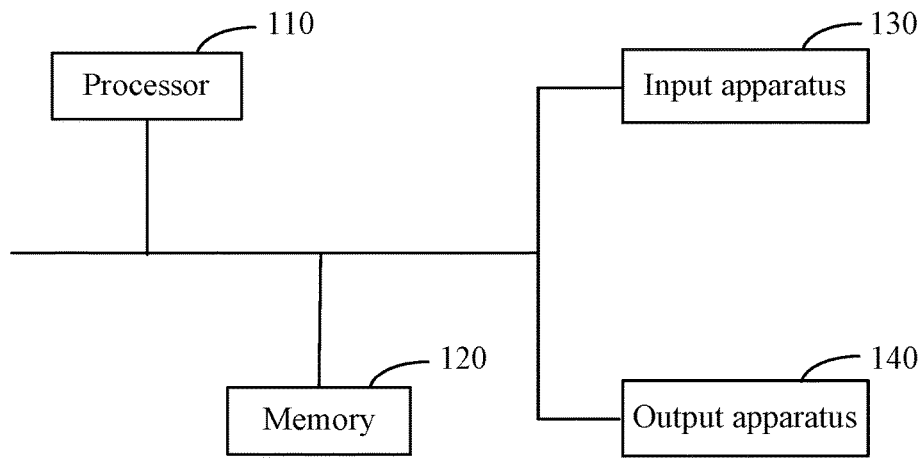
FIG. 8 is a schematic diagram of calculating a similarity between a target fingerprint and a comparison fingerprint according to an embodiment of the present application.
FIG. 9 is a structural diagram of an electronic device according to an embodiment of the present application.

In the fourth step (for example, step ④), with the set of fingerprint data, fingerprint comparison may be performed with the complete fingerprint (into which four pieces of fingerprint data are converted) of the confidential document, and the similarity (for example, step ⑤) is calculated. As shown in FIG. 8, the XOR operation may be performed on integers of the document fingerprints to obtain a number, and the number of 1s in the binary of this number is used as the basis for determining the similarity, where the smaller the data is, the higher the similarity with the target document is. It may be finally found out that a file with an ID of 10001 is the same as the confidential document, and the confidential document hidden in the document library is found out.

According to the preceding application process, the present embodiment may include the following.

(1) Confidential Document Search Test 1.8 million pieces of document data and 40 known confidential documents exist. It is necessary to query whether documents same or similar to the confidential documents exist among the 1.8 million pieces of data so as to perform filtering to prevent the leakage of the confidential documents caused by copying or forwarding. The test data is described in Table 1.

TABLE 1

| Test file | Quantity (articles) | Size | Remarks |
|---|---|---|---|
| Document library (number of test texts) | 1078621 | 4.5 G | Unknown document library, the confidential document or a document similar to the confidential document may be included |
| Confidential document | 40 | 170 k | Known confidential document |

Figure 2:
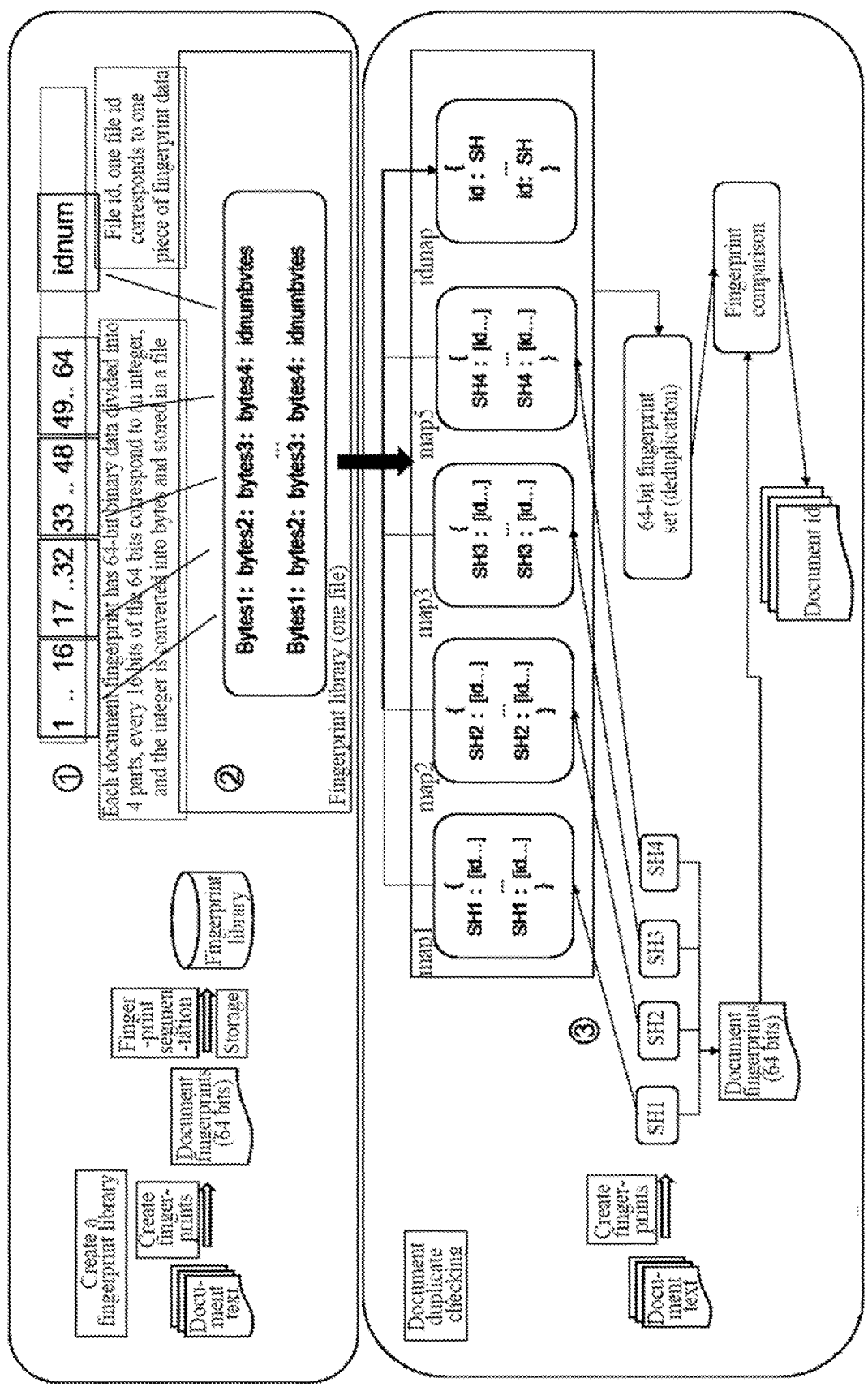
FIG. 2 is a schematic diagram of an application process according to an embodiment of the present application.

(ii) Steps of the Confidential Document Search Test 1, the fingerprint library is created according to the first step (①) in FIG. 2.
  (1) Fingerprints are created for 1078621 articles according to the steps in FIG. 3.
  (2) After the fingerprint is created for each document, according to FIG. 4, the fingerprint and the byte data into which the file number ID is converted are stored in a text file and used as fingerprint library data with a total size of 21M.

2, according to the second step (②) in FIG. 2, a duplicate checking stage in the fingerprint library is described below.
  (1) Fingerprint library data is read into the memories according to FIG. 5.
  (2) According to FIG. 7, contents of 40 confidential documents are circularly read, fingerprint data is created, the fingerprint data is found out from the memories, and an XOR processing is performed to calculate the Hamming distance, thereby obtaining a file ID, that is, obtaining a file same as or highly similar to the confidential document.

(iii) Test Results

In this embodiment, the document fingerprint is stored in the form of binary string data into a database mysql to perform document fingerprint comparison and search, and the test results and the search and comparison results of this method are described in Table 2.

TABLE 2

| Storage manner | Data format | Number of test texts | Number of confidential cuments | Average time for comparison and search of each fingerprint | Accuracy |
|---|---|---|---|---|---|
| MySQL | String | 1078621 | 40 | 0.5 s | 100% |
| Local file | Bytes | 1078621 | | 0.0004 s | 100% |

The following two aspects can be seen from the comparison.

1, the first aspect is about accuracy, where both methods have the accuracy of 100%, and confidential documents may be accurately found out from the unknown document library in both methods.

2, the second aspect is about efficiency, where document fingerprints are stored significantly slower in the form of strings; and an average of 0.0004s is needed for the comparison and search of document fingerprints stored in the form of bytes, reaching a millisecond level, and the efficiency is improved by a thousand times.

In summary, when the present application is applied to a large scale of texts, in the case where both the document size and the number of documents are relatively large, the method of the present application may be represented in Table 3.

TABLE 3

| Types | Results | Descriptions |
| --- | --- | --- |
| Size of the text | 64 bits | Regardless of the text size, the finally created document fingerprint is 64-bit binary data represented by an integer or a list of integers, thereby greatly reducing the dimension of the text |
| Massive data storage | Hundreds M (tens of millions in scale) | In the case of tens or hundreds of millions of texts, a file storing fingerprints may occupy only a few hundred M or a few G, thereby greatly reducing the space required for text storage |
| Massive data query | ms level (tens of millions in scale) | When a fingerprint library is created for 10 million or hundreds of millions of texts, the efficiency of searching for files same as or highly similar to the target file after the memories are read is at the millisecond level, and the speed is faster |

Moreover, when there is a known confidential document, a confidential document with contents same as or similar to contents of this document may exist in the document library, but a storage location is modified and is not kept in mind. In this case, the ID of the document same as or similar to this confidential document may be found out quickly through the method of the present application, so as to find out the document, thereby timely performing relevant operations to prevent leakage. For another example, when a confidential document library and a target document exist, whether an article is the same or similar confidential document as the document in the confidential document library may be determined through the method of the present application.

FIG. 9 is a structural diagram of hardware of an electronic device according to an embodiment of the present application. As shown in FIG. 9, the electronic device includes one or more processors 110 and a memory 120. One processor 110 is used as an example in FIG. 9.

The electronic device may further include an input apparatus 130 and an output apparatus 140.

The processor 110, the memory 120, the input apparatus 130, and the output apparatus 140 in the electronic device may be connected by a bus or in other manners. A connection by a bus is used as an example in FIG. 6.

As a computer-readable storage medium, the memory 120 may be configured to store software programs, computer-executable programs, and modules. The processor 110 runs the software programs, instructions and modules stored in the memory 120 to perform function applications and data processing, that is, to implement any method in the preceding embodiments.

The memory 120 may include a program storage region and a data storage region. The program storage region may store an operating system and an application program required by at least one function. The data storage region may store the data created according to the use of the electronic device. Additionally, the memory may include a volatile memory, for example, a random-access memory (RAM), and may also include a non-volatile memory, for example, at least one magnetic disk memory, a flash memory, or another non-transitory solid-state memory.

The memory 120 may be a non-transitory computer storage medium or a transitory computer storage medium. The non-transitory computer storage medium includes, for example, at least one magnetic disk memory, a flash memory, or another non-volatile solid-state memory. In some embodiments, the memory 120 optionally includes memories which are disposed remotely relative to the processor 110. These remote memories may be connected to the electronic device via a network. The examples of the preceding network may include the Internet, an intranet, a local area network, a mobile communication network, and a combination thereof.

The input apparatus 130 may be configured to receive the input digital or character information and generate key signal input related to user settings and function control of the electronic device. The output apparatus 140 may include a display device, for example, a display screen.

This embodiment further provides a computer-readable storage medium storing computer-executable instructions, where the computer-executable instructions are configured to execute the preceding methods.

All or part of the processes in the methods of the preceding embodiments may be implemented by related hardware executed by computer programs, these programs may be stored in a non-transitory computer-readable storage medium, and during the execution of these programs, the processes in the preceding method embodiments may be included. The non-transitory computer-readable storage medium may be a magnetic disk, an optical disk, a read-only memory (ROM), or an RAM.

Compared with the related art, the present application has the advantages described below.

First, in the present application, fingerprints in the form of integers are created by means of displacement and have advantages of high efficiency and easy storage compared with string fingerprints obtained by means of string splicing; in addition, in a fingerprint storage stage, the present application uses a byte data storage manner, thereby greatly reducing the space occupied by data storage.

Second, in the present application, the stored fingerprints are pre-read and stored in the map memories, so as to effectively reduce the time for subsequent searching for document fingerprints, and the similarity is calculated by using the integer XOR operation so that on the basis of ensuring the accuracy of similarity calculation, the efficiency of similarity calculation between fingerprints and duplicate checking is greatly improved.

What is claimed is:

1. A text duplicate checking method, comprising:
   acquiring an original text data set and creating a corresponding fingerprint set in an integer form, wherein the original text data set comprises a plurality of statements, and each of the plurality of statements is provided with a text identity (ID);
   storing both the fingerprint set and a text ID corresponding to each of fingerprints in the fingerprint set in a byte data manner to obtain a fingerprint library;
   acquiring a target text and creating a corresponding target fingerprint;
   reading all byte data from the fingerprint library and storing all the fingerprints and corresponding text IDs in corresponding map memories;
   obtaining a comparison fingerprint set from the map memories according to the target fingerprint, calculating a similarity between the target fingerprint and each of comparison fingerprints in the comparison fingerprint set separately by using an integer exclusive OR (XOR) operation method, and recording a number of 1s in binary values of each similarity; and
   based on a determination result that the number of 1s in the binary values of one similarity is less than or equal to a preset value, querying a text ID corresponding to a comparison fingerprint corresponding to the one similarity in the map memories, to implement duplicate checking of the target text;
   wherein acquiring the original text data set and creating the corresponding fingerprint set in the integer form comprises:
   acquiring the original text data set;
   performing word segmentation on each of the plurality of statements in the original text data set to obtain feature vectors corresponding to each of the plurality of statements;
   calculating a hash value of each of the feature vectors corresponding to each of the plurality of statements through a hash function;
   weighting each of the feature vectors of each of the plurality of statements;
   accumulating a weighted result of each of the feature vectors of each of the plurality of statements to obtain a sequence string corresponding to each of the plurality of statements;
   performing displacement calculation on the sequence string corresponding to each of the plurality of statements to obtain a fingerprint corresponding to each of the plurality of statements, wherein the fingerprint is represented by four fingerprint integer values; and
   arranging and combining fingerprints corresponding to all the plurality of statements in sequence to obtain the fingerprint set corresponding to the original text data set;
   wherein storing both the fingerprint set and the text ID corresponding to each of fingerprints in the fingerprint set in the byte data manner to obtain the fingerprint library comprises;
   converting each of the fingerprints in the fingerprint set and the text ID corresponding to the each of the fingerprints into byte data, respectively, and combining the byte data into which each of the fingerprints in the fingerprint set and the text ID corresponding to the each of the fingerprints are converted and storing the combined byte data into the fingerprint library, wherein the data byte into which each of the fingerprints and the text ID corresponding to the each of the fingerprints are converted comprises 20 bytes in total, a first segment of 4-byte data to a fourth segment of 4-byte data in the 20 bytes correspond to the four fingerprint integer values of the fingerprint, respectively, and a fifth segment of 4-byte data in the 20 bytes corresponds to a text ID integer value;
   wherein reading all the byte data from the fingerprint library and storing all the fingerprints and the corresponding text IDs in the corresponding map memories comprises:
   reading byte data from the fingerprint library;
   converting the read byte data into integers, wherein the integers into which the byte data is converted comprises a first fingerprint integer value, a second fingerprint integer value, a third fingerprint integer value, a fourth fingerprint integer value, and the text ID integer value; and
   storing the integers into which the byte data is converted in five map formats, respectively, wherein the first fingerprint integer value and the text ID integer value, the second fingerprint integer value and the text ID integer value, the third fingerprint integer value and the text ID integer value, and the fourth fingerprint integer value and the text ID integer value are stored in first four maps sequentially, a last map is used as an index map, and a complete fingerprint composed of the four fingerprint integer values and the text ID integer value are stored in the last map.

2. The text duplicate checking method of claim 1, wherein a process of the displacement calculation comprises: performing a displacement operation once every 16 bits: based on a determination result that an integer value corresponding to 16-bit data is greater than or equal to 0, displacing the 16-bit data to the right by one bit and adding 1; and based on a determination result that an integer value corresponding to 16-bit data is less than 0, displacing the 16-bit data to the right by one bit, to obtain the fingerprint corresponding to each of the plurality of statements.

3. The text duplicate checking method of claim 1, wherein obtaining the comparison fingerprint set from the map memories according to the target fingerprint, calculating the similarity between the target fingerprint and each of comparison fingerprints in the comparison fingerprint set separately by using the integer XOR operation method, and recording the number of 1s in the binary values of each similarity comprises:
   searching for, according to four fingerprint integer values of the target fingerprint, a same fingerprint integer value from a first map, a second map, a third map and a fourth map, respectively; based on a determination result that the same fingerprint integer value exists in one map, extracting text ID integer values corresponding to the same fingerprint integer value from the one map; and based on a determination result that the same fingerprint integer value does not exist in the one map, returning a null value;

combining the extracted text ID integer values to obtain a text ID set;

deleting a repeated text ID integer value in the obtained text ID set to obtain a deduplicated text ID set, wherein the deduplicated text ID set comprises different text ID integer values;

extracting, according to a sequence of the different text ID integer values, fingerprints corresponding to the text ID integer values in the text ID set from a fifth map to obtain the comparison fingerprint set; and calculating the similarity between the target fingerprint and each of the fingerprints in the comparison fingerprint set separately by using the integer XOR operation method, and recording the number of 1s in the binary values of each similarity.

4. The text duplicate checking method of claim 3, wherein searching for the same fingerprint integer value from the first map, the second map, the third map and the fourth map, respectively comprises:

searching for a fingerprint integer value that is the same as a first fingerprint integer value of the target fingerprint from the first map;

searching for a fingerprint integer value that is the same as a second fingerprint integer value of the target fingerprint from the second map;

searching for a fingerprint integer value that is the same as a third fingerprint integer value of the target fingerprint from the third map; and searching for a fingerprint integer value that is the same as a fourth fingerprint integer value of the target fingerprint from the fourth map.

5. The text duplicate checking method of claim 1, wherein the preset value is 3.

6. An electronic device, comprising:

a processor; and a memory configured to store a program, wherein the program, when executed by the processor, causes the processor to perform:

acquiring an original text data set and creating a corresponding fingerprint set in an integer form, wherein the original text data set comprises a plurality of statements, and each of the plurality of statements is provided with a text identity (ID);

storing both the fingerprint set and a text ID corresponding to each of fingerprints in the fingerprint set in a byte data manner to obtain a fingerprint library;

acquiring a target text and creating a corresponding target fingerprint;

reading all byte data from the fingerprint library and storing all the fingerprints and corresponding text IDs in corresponding map memories;

obtaining a comparison fingerprint set from the map memories according to the target fingerprint, calculating a similarity between the target fingerprint and each of comparison fingerprints in the comparison fingerprint set separately by using an integer exclusive OR (XOR) operation method, and recording a number of 1s in binary values of each similarity; and based on a determination result that the number of 1s in the binary values of one similarity is less than or equal to a preset value, querying a text ID corresponding to a comparison fingerprint corresponding to the one similarity in the map memories, to implement duplicate checking of the target text;

wherein the program, when executed by the processor, causes the processor to perform acquiring the original text data set and creating the corresponding fingerprint set in the integer form in the following manners;

acquiring the original text data set;

performing word segmentation on each of the plurality of statements in the original text data set to obtain feature vectors corresponding to each of the plurality of statements;

calculating a hash value of each of the feature vectors corresponding to each of the plurality of statements through a hash function;

weighting each of the feature vectors of each of the plurality of statements;

accumulating a weighted result of each of the feature vectors of each of the plurality of statements to obtain a sequence string corresponding to each of the plurality of statements;

performing displacement calculation on the sequence string corresponding to each of the plurality of statements to obtain a fingerprint corresponding to each of the plurality of statements, wherein the fingerprint is represented by four fingerprint integer values; and arranging and combining fingerprints corresponding to all the plurality of statements in sequence to obtain the fingerprint set corresponding to the original text data set;

wherein the program, when executed by the processor, causes the processor to perform storing both the fingerprint set and the text ID corresponding to each of fingerprints in the fingerprint set in the byte data manner to obtain the fingerprint library in the following manners;

converting each of the fingerprints in the fingerprint set and the text ID corresponding to the each of the fingerprints into byte data, respectively, and combining the byte data into which each of the fingerprints in the fingerprint set and the text ID corresponding to the each of the fingerprints are converted and storing the combined byte data into the fingerprint library, wherein the data byte into which each of the fingerprints and the text ID corresponding to the each of the fingerprints are converted comprises 20 bytes in total, a first segment of 4-byte data to a fourth segment of 4-byte data in the 20 bytes correspond to the four fingerprint integer values of the fingerprint, respectively, and a fifth segment of 4-byte data in the 20 bytes corresponds to a text ID integer value;

wherein the program, when executed by the processor, causes the processor to perform reading all the byte data from the fingerprint library and storing all the fingerprints and the corresponding text IDs in the corresponding map memories in the following manners;

reading byte data from the fingerprint library;

converting the read byte data into integers, wherein the integers into which the byte data is converted comprises a first fingerprint integer value, a second fingerprint integer value, a third fingerprint integer value, a fourth fingerprint integer value, and the text ID integer value; and storing the integers into which the byte data is converted in five map formats, respectively, wherein the first fingerprint integer value and the text ID integer value, the second fingerprint integer value and the text ID integer value, the third fingerprint integer value and the text ID integer value, and the fourth fingerprint integer value and the text ID integer value are stored in first four maps sequentially, a last map is used as an index map, and a complete fingerprint composed of the four fingerprint integer values and the text ID integer value are stored in the last map.

7. The electronic device of claim 6, wherein a process of the displacement calculation comprises: performing a displacement operation once every 16 bits; based on a determination result that an integer value corresponding to 16-bit data is greater than or equal to 0), displacing the 16-bit data to the right by one bit and adding 1; and based on a determination result that an integer value corresponding to 16-bit data is less than 0 displacing the 16-bit data to the right by one bit, to obtain the fingerprint corresponding to each of the plurality of statements.

8. The electronic device of claim 6, wherein the program, when executed by the processor, causes the processor to perform obtaining the comparison fingerprint set from the map memories according to the target fingerprint, calculating the similarity between the target fingerprint and each of comparison fingerprints in the comparison fingerprint set separately by using the integer XOR operation method, and recording the number of 1s in the binary values of each similarity in the following way:
   searching for, according to four fingerprint integer values of the target fingerprint, a same fingerprint integer value from a first map, a second map, a third map and a fourth map, respectively; based on a determination result that the same fingerprint integer value exists in one map, extracting text ID integer values corresponding to the same fingerprint integer value from the one map; and based on a determination result that the same fingerprint integer value does not exist in the one map, returning a null value;
   combining the extracted text ID integer values to obtain a text ID set;
   deleting a repeated text ID integer value in the obtained text ID set to obtain a deduplicated text ID set, wherein the deduplicated text ID set comprises different text ID integer values;
   extracting, according to a sequence of the different text ID integer values, fingerprints corresponding to the text ID integer values in the text ID set from a fifth map to obtain the comparison fingerprint set; and
   calculating the similarity between the target fingerprint and each of the fingerprints in the comparison fingerprint set separately by using the integer XOR operation method, and recording the number of 1s in the binary values of each similarity.

9. The electronic device of claim 8, wherein the program, when executed by the processor, causes the processor to perform searching for the same fingerprint integer value from the first map, the second map, the third map and the fourth map, respectively in the following way:
   searching for a fingerprint integer value that is the same as a first fingerprint integer value of the target fingerprint from the first map;
   searching for a fingerprint integer value that is the same as a second fingerprint integer value of the target fingerprint from the second map;
   searching for a fingerprint integer value that is the same as a third fingerprint integer value of the target fingerprint from the third map; and
   searching for a fingerprint integer value that is the same as a fourth fingerprint integer value of the target fingerprint from the fourth map.

10. The electronic device of claim 6, wherein the preset value is 3.

11. A non-transitory computer-readable storage medium storing computer-executable instructions, wherein the computer-executable instructions are configured to execute:
   acquiring an original text data set and creating a corresponding fingerprint set in an integer form, wherein the original text data set comprises a plurality of statements, and each of the plurality of statements is provided with a text identity (ID);
   storing both the fingerprint set and a text ID corresponding to each of fingerprints in the fingerprint set in a byte data manner to obtain a fingerprint library;
   acquiring a target text and creating a corresponding target fingerprint;
   reading all byte data from the fingerprint library and storing all the fingerprints and corresponding text IDs in corresponding map memories;
   obtaining a comparison fingerprint set from the map memories according to the target fingerprint, calculating a similarity between the target fingerprint and each of comparison fingerprints in the comparison fingerprint set separately by using an integer exclusive OR (XOR) operation method, and recording a number of 1s in binary values of each similarity; and
   based on a determination result that the number of 1s in the binary values of one similarity is less than or equal to a preset value, querying a text ID corresponding to a comparison fingerprint corresponding to the one similarity in the map memories, to implement duplicate checking of the target text;
   wherein the computer-executable instructions are configured to execute acquiring the original text data set and creating the corresponding fingerprint set in the integer form in the following manners;
   acquiring the original text data set;
   performing word segmentation on each of the plurality of statements in the original text data set to obtain feature vectors corresponding to each of the plurality of statements;
   calculating a hash value of each of the feature vectors corresponding to each of the plurality of statements through a hash function;
   weighting each of the feature vectors of each of the plurality of statements;
   accumulating a weighted result of each of the feature vectors of each of the plurality of statements to obtain a sequence string corresponding to each of the plurality of statements;
   performing displacement calculation on the sequence string corresponding to each of the plurality of statements to obtain a fingerprint corresponding to each of the plurality of statements, wherein the fingerprint is represented by four fingerprint integer values; and
   arranging and combining fingerprints corresponding to all the plurality of statements in sequence to obtain the fingerprint set corresponding to the original text data set;
   wherein the computer-executable instructions are configured to execute storing both the fingerprint set and the text ID corresponding to each of fingerprints in the fingerprint set in the byte data manner to obtain the fingerprint library in the following manners;
   converting each of the fingerprints in the fingerprint set and the text ID corresponding to the each of the fingerprints into byte data, respectively, and combining the byte data into which each of the fingerprints in the fingerprint set and the text ID corresponding to the each of the fingerprints are converted and storing the combined byte data into the fingerprint library, wherein the data byte into which each of the fingerprints and the text ID corresponding to the each of the fingerprints are converted comprises 20 bytes in total, a first segment of 4-byte data to a fourth segment of 4-byte data in the 20 bytes correspond to the four fingerprint integer values of the fingerprint, respectively, and a fifth segment of 4-byte data in the 20 bytes corresponds to a text ID integer value;

wherein the computer-executable instructions are configured to execute reading all the byte data from the fingerprint library and storing all the fingerprints and the corresponding text IDs in the corresponding map memories in the following manners;

reading byte data from the fingerprint library;

converting the read byte data into integers, wherein the integers into which the byte data is converted comprises a first fingerprint integer value, a second fingerprint integer value, a third fingerprint integer value, a fourth fingerprint integer value, and the text ID integer value; and storing the integers into which the byte data is converted in five map formats, respectively, wherein the first fingerprint integer value and the text ID integer value, the second fingerprint integer value and the text ID integer value, the third fingerprint integer value and the text ID integer value, and the fourth fingerprint integer value and the text ID integer value are stored in first four maps sequentially, a last map is used as an index map, and a complete fingerprint composed of the four fingerprint integer values and the text ID integer value are stored in the last map.

12. The non-transitory computer-readable storage medium of claim 11, wherein a process of the displacement calculation comprises: performing a displacement operation once every 16 bits: based on a determination result that an integer value corresponding to 16-bit data is greater than or equal to 0, displacing the 16-bit data to the right by one bit and adding 1; and based on a determination result that an integer value corresponding to 16-bit data is less than 0, displacing the 16-bit data to the right by one bit, to obtain the fingerprint corresponding to each of the plurality of statements.

13. The non-transitory computer-readable storage medium of claim 11, wherein the computer-executable instructions are configured to execute obtaining the comparison fingerprint set from the map memories according to the target fingerprint, calculating the similarity between the target fingerprint and each of comparison fingerprints in the comparison fingerprint set separately by using the integer XOR operation method, and recording the number of 1s in the binary values of each similarity in the following manners:

searching for, according to four fingerprint integer values of the target fingerprint, a same fingerprint integer value from a first map, a second map, a third map and a fourth map, respectively: based on a determination result that the same fingerprint integer value exists in one map, extracting text ID integer values corresponding to the same fingerprint integer value from the one map; and based on a determination result that the same fingerprint integer value does not exist in the one map, returning a null value;

combining the extracted text ID integer values to obtain a text ID set;

deleting a repeated text ID integer value in the obtained text ID set to obtain a deduplicated text ID set, wherein the deduplicated text ID set comprises different text ID integer values;

extracting, according to a sequence of the different text ID integer values, fingerprints corresponding to the text ID integer values in the text ID set from a fifth map to obtain the comparison fingerprint set; and calculating the similarity between the target fingerprint and each of the fingerprints in the comparison fingerprint set separately by using the integer XOR operation method, and recording the number of 1s in the binary values of each similarity.

14. The non-transitory computer-readable storage medium of claim 13, wherein the computer-executable instructions are configured to execute searching for the same fingerprint integer value from the first map, the second map, the third map and the fourth map, respectively in the following manners:

searching for a fingerprint integer value that is the same as a first fingerprint integer value of the target fingerprint from the first map;

searching for a fingerprint integer value that is the same as a second fingerprint integer value of the target fingerprint from the second map;

searching for a fingerprint integer value that is the same as a third fingerprint integer value of the target fingerprint from the third map; and searching for a fingerprint integer value that is the same as a fourth fingerprint integer value of the target fingerprint from the fourth map.

15. The non-transitory computer-readable storage medium of claim 11, wherein the preset value is 3.

* * * * *